US010913040B2

(12) United States Patent
Li et al.

(10) Patent No.: US 10,913,040 B2
(45) Date of Patent: Feb. 9, 2021

(54) PRESSURIZED CARBONATION REACTION APPARATUS AND ITS METHOD

(71) Applicant: XIAMEN UNIVERSITY, Xiamen (CN)

(72) Inventors: Jun Li, Xiamen (CN); Qunhong Liu, Xiamen (CN); Wenxin Wei, Xiamen (CN); Bao Zhu, Xiamen (CN); Xiaohui Hu, Xiamen (CN); Hongtao Wang, Xiamen (CN); Yuzhong Su, Xiamen (CN); Yanzhen Hong, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 127 days.

(21) Appl. No.: 15/826,433

(22) Filed: Nov. 29, 2017

(65) Prior Publication Data

US 2018/0078917 A1   Mar. 22, 2018

Related U.S. Application Data

(63) Continuation-in-part of application No. PCT/CN2015/094407, filed on Nov. 12, 2015.

(30) Foreign Application Priority Data

May 29, 2015   (CN) .......................... 2015 1 0288005

(51) Int. Cl.

| C01B 31/24 | (2006.01) |
| B01J 3/04 | (2006.01) |
| B01J 10/00 | (2006.01) |
| B01J 19/24 | (2006.01) |
| B01J 19/26 | (2006.01) |
| C01F 11/18 | (2006.01) |
| C01B 32/60 | (2017.01) |
| B01J 4/00 | (2006.01) |
| B01J 19/18 | (2006.01) |

(52) U.S. Cl.
CPC .............. B01J 3/04 (2013.01); B01J 4/002 (2013.01); B01J 10/002 (2013.01); B01J 19/18 (2013.01); B01J 19/24 (2013.01); B01J 19/26 (2013.01); C01B 32/60 (2017.08); C01F 11/18 (2013.01); B01J 2219/00087 (2013.01); B01J 2219/00162 (2013.01); B01J 2219/00182 (2013.01); Y02P 20/141 (2015.11)

(58) Field of Classification Search
CPC ............. B01J 3/04; C01B 32/60; C01F 11/18
See application file for complete search history.

(56) References Cited

U.S. PATENT DOCUMENTS

| 9,108,151 B2 * | 8/2015 | Brent .................... B01D 53/62 |
| 2006/0292056 A1 | 12/2006 | Lin |
| 2015/0023127 A1 | 1/2015 | Chon et al. |

FOREIGN PATENT DOCUMENTS

| CN | 1597093 A | 3/2005 |
| CN | 1883786 A | 12/2006 |
| CN | 101406818 A | 4/2009 |
| CN | 101618886 A | 1/2010 |
| CN | 102020284 A | 4/2011 |
| CN | 102039151 A | 5/2011 |
| CN | 102039195 A | 5/2011 |
| CN | 102491396 A | 6/2012 |
| CN | 102875840 A | 1/2013 |
| CN | 103086388 A | 5/2013 |
| CN | 103808117 A | 5/2014 |
| CN | 104024157 A | 9/2014 |
| CN | 104229849 A | 12/2014 |
| CN | 104477924 A | 4/2015 |
| CN | 104826552 A | 8/2015 |

OTHER PUBLICATIONS

PCT; PCT App No. PCT/CN2015/094407; International Search Report and Written Opinion dated Mar. 1, 2016.

\* cited by examiner

Primary Examiner — Stuart L Hendrickson
(74) Attorney, Agent, or Firm — Fitch, Even, Tabin & Flannery LLP

(57) ABSTRACT

A pressurized carbonation reaction apparatus and method thereof are provided. The apparatus comprises: an atomizing gas tank, a plurality of compressors, a plurality of buffer tanks, a plurality of pre-heaters, a pressurized liquid tank, a nozzle, a raw material tank, a carbon dioxide tank, a high-pressure reactor, a raw product tank, a feed pump, a plurality of pressure display gauges, a plurality of temperature controllers with display gauges and a plurality of back pressure valves. The method comprises: dissolving a solid material in a solvent, and storing a resulting liquid material in the raw material tank; introducing gas in the carbon dioxide tank to the high-pressure reactor, controlling temperatures of the high-pressure reactor and the pressurized liquid tank, and pumping, by the feed pump, the liquid material into the pressurized liquid tank to ensure a pressure difference between the pressurized liquid tank and the high-pressure reactor; opening a second check valve, and ensuring that the liquid material reacts with a carbon dioxide atmosphere in the high-pressure reactor after being atomized via the nozzle under a stable pressure difference between the high-pressure reactor and the pressurized liquid tank; and ensuring that when the liquid material in the high-pressure reactor is at a corresponding liquid level, a fifth check valve is opened and discharge continues to obtain a reaction product.

7 Claims, 1 Drawing Sheet

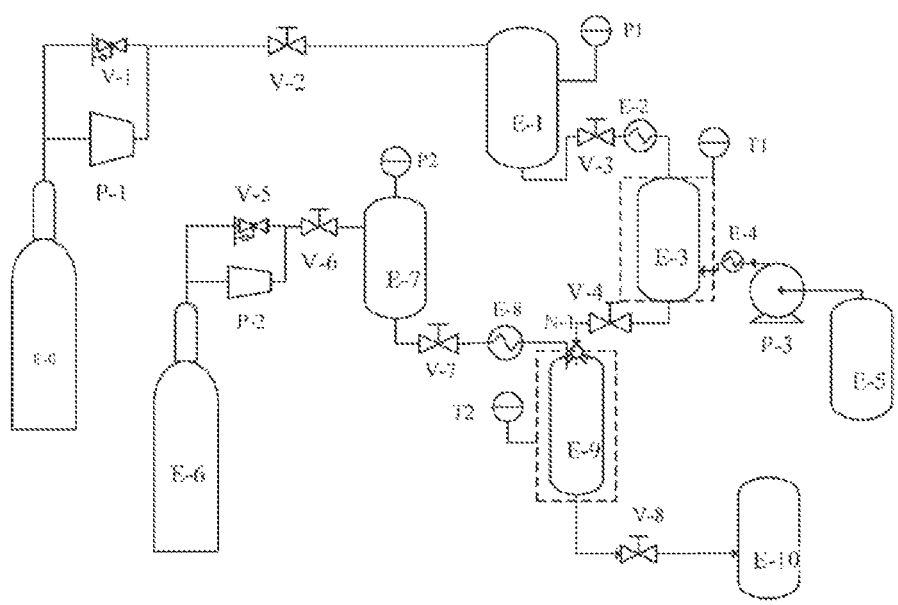

PRESSURIZED CARBONATION REACTION APPARATUS AND ITS METHOD

CROSS-REFERENCE TO RELATED APPLICATIONS

The present patent application is a continuation-in-part of International Application No. PCT/CN2015/094407 filed on Nov. 12, 2015, which claims priority to Chinese Patent Application No. 201510288005.3 filed on May 29, 2015. The entire contents of each of these applications are incorporated herein by reference.

FIELD OF THE INVENTION

The present invention relates to an apparatus for carbonation reaction, in particular to a pressurized carbonation reaction apparatus.

DESCRIPTION OF THE PRIOR ART

High pressure carbonation reaction refers to a direct reaction with high pressure carbon dioxide. High pressure carbonation reaction has been widely used in diverse fields including the preparation of inorganic materials and some organic reactions. The technology is mainly based on the use of inorganic materials, such as the reaction of water glass and carbon dioxide, the reaction of sodium metaaluminate and carbon dioxide and the like.

A method for preparing amorphous silica-aluminum by carbonation method is proposed in CN1597093A, where carbon dioxide is introduced to the raw material of sodium aluminate to adjust the pH value to realize batch synthesis of the silica-aluminum compound with the help of carbon dioxide in the atmospheric pressure reactor. Patent CN101618886A discloses an aluminum hydroxide and the preparation method thereof; the method uses sodium metaaluminate as the raw material. The carbonation method adopted is a surface reaction of gas phase and liquid phase, i.e., the bubbling reaction, and the aluminum hydroxide is synthesized in a batch reactor. CN102039195A develops a method for preparing alumina carrier which also adopts the bubbling reaction of carbonation method to synthesize alumina carrier in batch. Patent CN102039151A discloses a hydrogenation cracking catalyst and the preparation method thereof. The catalyst adopts amorphous silica-aluminum prepared by carbonation method and hydrothermal treatment. The pH is adjusted to 8~11 by carbon dioxide and the catalyst is synthesized by batch operation. All of the above patents adopt mixing raw material with carbon dioxide in the reactor under atmospheric pressure, or using carbon dioxide to adjust pH value of which the reaction time is relatively long, the degree of mixing of the raw material is affected by the apparatus, and the product stability cannot be ensured.

Patent CN102875840A discloses a method to prepare highly dispersed silica products by using sodium silicate solution and pressurized carbon dioxide with a surface active agent and silane coupling agent and undergoing ageing, washing and drying to obtain silica. CN102020284A proposes a high pressure carbonation reaction coupled with supercritical drying to prepare silica product: the sodium silicate solution reacts with supercritical or subcritical carbon dioxide under stirring in a high-pressure reactor for 1~60 minutes, washing the product and supercritical drying to obtain silica with relatively large pore volume. CN103086388A proposes a method for preparing silica with high pore volume by the reaction of water glass with certain concentration and carbon dioxide in a high-pressure reactor, ageing for 1-3 h, washing and drying. Patent CN104477924A proposes a supercritical carbonation method to produce nanometer spherical silica: ethanol is added into the sodium silicate solution, supercritical carbon dioxide is introduced under stirring for about 20 minutes, and silica product is obtained by supercritical drying. The above methods, as well as some of the other existing literature methods belong to the high pressure gas-liquid reaction (increasing and speeding up the dissolution of carbon dioxide in the liquid phase under the action of high pressure, stirring or additives). Although the mass transfer limit has been improved through high pressure compared with the atmospheric gas-liquid phase reaction, rapid mixing under high pressure is still not easily achieved, especially for the case of gel formation; therefore the residence time of the reaction in the reactor is prolonged. The reaction processes belong to batch reaction, suggesting that large reactors are necessary for large scale production. It is well known that large reactors operated at high pressure currently need high cost of investment.

How to break through the above limits and realize rapid and continuous carbonation reaction under high pressure and obtain stable product has been a topic of interest in the art.

SUMMARY OF THE INVENTION

The purpose of the present invention is to provide an apparatus for pressurized carbonation reaction which uses a nozzle or tube to atomize liquid reactant to fully contact with high pressure carbon dioxide to achieve rapid carbonation reaction.

In order to realize the above purpose, the invention adopts the following technical scheme:

A pressurized carbonation reaction apparatus, comprising: an atomizing gas tank, a plurality of compressors, a plurality of buffer tanks, a plurality of pre-heaters, a pressurized liquid tank, a nozzle, a raw material tank, a carbon dioxide tank, a high-pressure reactor, a raw product tank, a feed pump, a plurality of pressure display gauges, a plurality of temperature controllers with display gauges and a plurality of back pressure valves;

the outlet of the atomizing gas tank is connected to the inlet of a first compressor and the port of a first back pressure valve, the inlet of the first back pressure valve is connected to the outlet of the first compressor, and connected to the inlet of a first buffer tank via a first check valve, the outlet of the first buffer tank is connected to the inlet of a first pre-heater via a second check valve, the outlet of the first pre-heater is connected to the first inlet of the pressurized liquid tank;

the outlet of the raw material tank is connected to the inlet of the feed pump, the outlet of the feed pump is connected to the inlet of a second pre-heater, the outlet of the second pre-heater is connected to the second inlet of the pressurized liquid tank, the outlet of the pressurized liquid tank is connected to the inlet of the nozzle via the second check valve, the outlet of the nozzle is connected to the first inlet of the high-pressure reactor;

the outlet of the carbon dioxide tank is connected to the inlet of a second compressor and the port of a second back pressure valve, the inlet of the second back pressure valve is connected to the outlet of the second compressor, and connected to the inlet of a second buffer tank via a third check valve, the outlet of the second buffer tank is connected to the inlet of a third pre-heater via a fourth check valve, the outlet of the third pre-heater is connected to the second inlet of the high-pressure reactor;

the outlet of the high-pressure reactor is connected to the inlet of the raw product tank via a fifth check valve;

the first buffer tank and the second buffer tank are both provided with pressure display gauges; the pressurized liquid tank and the high-pressure reactor are both provided with temperature controllers with display gauges.

The first inlet of the high-pressure reactor is best provided in the top portion or the top side portion of the high-pressure reactor.

A method for pressurized carbonation reaction, wherein the above pressurized carbonation reaction apparatus is adopted, comprises the following steps:

1). weighing a solid material and dissolving it in the solvent completely, obtaining a liquid material, storing the liquid material in the raw material tank, preparing the liquid material with a concentration of 0.1~4.0 mol/L;

2). turning on the apparatus, the gas in the carbon dioxide tank is introduced into the high-pressure reactor via the second compressor, controlling the temperatures of the high-pressure reactor and the pressurized liquid tank, and then pumping the liquid material into the pressurized liquid tank by the feed pump to provide the pressurized liquid tank with pressure and ensuring a pressure difference between the pressurized liquid tank and the high-pressure reactor;

3). after the temperatures and pressures of the high-pressure reactor and the pressurized liquid tank are stabilized, opening the second check valve and ensuring that the liquid material fully contacts and rapidly reacts with a carbon dioxide atmosphere in the high-pressure reactor after being atomized via the nozzle under a stable pressure difference between the high-pressure reactor and the pressurized liquid tank;

4). ensuring opening the fifth check valve when the liquid material in the high-pressure reactor is at a corresponding liquid level, continuously discharging and obtaining a reaction product.

In step 2), the temperatures of the high-pressure reactor and the pressurized liquid tank may be 10° C.~100° C.

In step 2), the pressure of the high-pressure reactor may be 0.1~15.0 MPa, the pressure of the pressurized liquid tank may be 2.0~20.0 MPa, ensuring the pressure of the high-pressure reactor is lower than that of the pressurized liquid tank.

In step 2), the pressure of the pressurized liquid tank is achieved by pumping the liquid material, or by pumping high-pressure inert gas by the first compressor to obtain desired pressure; the pressure of the high-pressure reactor is achieved by pumping carbon dioxide by the second compressor to obtain desired pressure.

In step 3), the pressure of the pressurized liquid tank may be controlled to be 10.0 MPa by pumping high-pressure inert gas by the first compressor; the pressure of the high-pressure reactor may be controlled to be 4.0 MPa by pumping carbon dioxide by the second compressor.

In step 4), the height of the liquid level in the high-pressure reactor is controlled by the fifth check valve to achieve continuous and stable discharge of the product.

The advantages of the present invention lie in that: the liquid reactant is atomized into small droplets under high pressure by the atomizing device under high pressure, and these small droplets rapidly and fully react with high pressure carbon dioxide. (1) The reaction time is very short which takes only a few seconds from the entering of the raw material into the reaction tank to discharging. It shortens a large amount of time compared to patent CN201310019808.X where the reaction takes 1~3 h in the reactor. (2) The raw material is fully reacted after atomization and hence its conversion rate is very high. For example, when producing silica with large pore volume, the conversion rate of the raw material can reach more than 99% steadily, which exceeds the conversion rate of silica production process in the current industry. (3) The present invention adopts atomizing rapid reaction in the contact and reaction of the raw material and carbon dioxide, which does not require the use of high pressure stirring device and the like, solving the technical challenges of industrial high-pressure stirring and solving the problem of current high investment of large high pressure equipment, this may largely promote the application of high pressure carbonation reaction in the current industrial production. (4) The process of the present invention is simple and easy to control, which can realize continuous and large scale production of carbonation reaction, obtaining products with stable and high quality, and realize energy conservation and environment protection. For example, in the production of silica with large pore volume, by adjusting parameters, silica product with large pore volume and slightly transparent silica product with large specific surface area: BJH pore volume>3.0 $cm^3/g$, BJH average pore size>20 nm and BET specific surface area>600 $cm^2/g$. The transparency, the pore volume, the specific surface area and other properties are all superior to other high-end products in the current industry.

BRIEF DESCRIPTION OF THE DRAWINGS

FIG. 1 is a structural schematic diagram of an embodiment of the pressurized carbonation reaction apparatus of the present invention.

DETAILED DESCRIPTION OF THE PREFERRED EMBODIMENTS

Referring to FIG. 1, a pressurized carbonation reaction apparatus according to an embodiment of the present invention comprises: atomizing gas tank E-0, a plurality of compressors, a plurality of buffer tanks, a plurality of pre-heaters, pressurized liquid tank E-3, nozzle N-1, raw material tank E-5, carbon dioxide tank E-6, high-pressure reactor E-9, raw product tank E-10, feed pump P-3, a plurality of pressure display gauges, a plurality of temperature controllers with display gauges, a plurality of back pressure valves and a plurality of check valves.

The outlet of the atomizing gas tank E-0 is connected to the inlet of a first compressor P-1 and the port of a first back pressure valve V-1, the inlet of the first back pressure valve V-1 is connected to the outlet of the first compressor P-1, and connected to the inlet of a first buffer tank E-1 via a first check valve V-2, the outlet of the first buffer tank E-1 is connected to the inlet of a first pre-heater E-2 via a second check valve V-3, the outlet of the first pre-heater E-2 is connected to the first inlet of the pressurized liquid tank E-3.

The outlet of the raw material tank E-5 is connected to the inlet of the feed pump P-3, the outlet of the feed pump P-3 is connected to the inlet of a second pre-heater E-4, the outlet of the second pre-heater E-4 is connected to the second inlet of the pressurized liquid tank E-3, the outlet of the pressurized liquid tank E-3 is connected to the inlet of the nozzle N-1 via the second check valve V-4, the outlet of the nozzle N-1 is connected to the first inlet of the high-pressure reactor E-9, the outlet of the nozzle N-1 is connected to the first inlet of the high-pressure reactor E-9 located in its top portion.

The outlet of the carbon dioxide tank E-6 is connected to the inlet of a second compressor P-2 and the port of a second back pressure valve V-5, the inlet of the second back pressure valve V-5 is connected to the outlet of the second compressor P-2, and connected to the inlet of a second buffer tank E-7 via a third check valve V-6, the outlet of the second buffer tank E-7 is connected to the inlet of a third pre-heater E-8 via a fourth check valve V-7, the outlet of the third pre-heater E-8 is connected to the second inlet of the high-pressure reactor E-9.

The outlet of the high-pressure reactor E-9 is connected to the inlet of the raw product tank E-10 via a fifth check valve V-8. The first buffer tank E-1 and the second buffer tank E-7 are both provided with pressure display gauges P1 and P2; the pressurized liquid tank E-3 and the high-pressure reactor E-9 are both provided with temperature controllers with display gauges T1 and T2.

A method for pressurized carbonation reaction adopts the above pressurized carbonation reaction apparatus and comprises the following steps:

1). weighing a certain amount of solid material and dissolving it in the solvent (e.g., water and the like), or heating appropriately until the solid material is totally dissolved in the solvent, and preparing the liquid material with a concentration about 0.1~4.0 mol/L as required;

2). turning on the apparatus, carbon dioxide with certain pressure is introduced into the high-pressure reactor E-9, controlling the temperatures of the high-pressure reactor E-9 and the pressurized liquid tank E-3, and then pumping the liquid material into the pressurized liquid tank E-3 by the feed pump P-3 to provide the pressurized liquid tank E-3 with certain pressure and ensuring a pressure difference between the pressurized liquid tank E-3 and the high-pressure reactor E-9;

3). after the temperatures and pressures of the high-pressure reactor E-9 and the pressurized liquid tank E-3 are stabilized, opening the second check valve V-4, and ensuring that the liquid material fully contacts and rapidly reacts with a carbon dioxide atmosphere in the high-pressure reactor E-9 after being atomized via the nozzle N-1 under a stable pressure difference between the high-pressure reactor E-9 and the pressurized liquid tank E-3;

4). ensuring opening the fifth check valve V-8 when the liquid material in the high-pressure reactor E-9 is at a corresponding liquid level, continuously discharging and obtaining a reaction product.

In step 1), the liquid material refers to solution and suspension containing reactants, wherein additives may be added according to product requirement.

In step 2), the temperatures of the high-pressure reactor E-9 and the pressurized liquid tank E-3 may be set around 10~100° C.

In step 2), the pressure of the high-pressure reactor E-9 may be controlled in the range of 0.1~15.0 MPa, the pressure of the pressurized liquid tank E-3 may be controlled in the range of 2.0~20.0 MPa, and ensuring the pressure of the high-pressure reactor E-9 is lower than that of the pressurized liquid tank E-3.

In step 2), ensuring a certain pressure difference between the pressurized liquid tank E-3 and the high-pressure reactor E-9, wherein the pressure of the pressurized liquid tank E-3 may be achieved by pumping the liquid material by feed pump P-3, or by pumping high-pressure inert gas (e.g. nitrogen and the like) by the first compressor P-1 to obtain desired pressure; the pressure of the high-pressure reactor E-9 may be achieved by pumping carbon dioxide by the second compressor P-2 to obtain desired pressure.

In step 3), the nozzle is commercially available, of which the model and size can be selected according to the scale of the equipment. Or atomizing of raw material liquid can be achieved by atomizing of liquid material by atomized gas. For example, the pressure of the pressurized liquid tank E-3 is controlled to be 10.0 MPa by pumping high-pressure inert gas nitrogen by the first compressor P-1; the pressure of the high-pressure reactor E-9 is controlled to be 4.0 MPa by pumping carbon dioxide by the second compressor P-2. In this way the liquid material can be well-atomized into the high-pressure reactor E-9.

In step 4), the height of the liquid level in the high-pressure reactor E-9 may be controlled by the fifth check valve to achieve continuous and stable discharge of the product. Or batch discharge may be performed after accumulating to certain height of the liquid level. The height of the liquid level can be determined as required.

Examples of silica preparation method adopting the pressurized carbonation reaction apparatus according to the present embodiment are provided hereinafter:

Example 1

Materials: Sodium silicate nonahydrate (Sinopharm Chemical Reagent Co., Ltd., Analytically pure), carbon dioxide (Xiamen Linde gas, purity≥99%).

Preparation work: 5 L of 0.25 mol/L sodium silicate solution is prepared; the preheating temperature is set at 25° C. Carbon dioxide is charged into the high-pressure reactor, and the pressure is stabilized at 4.0 MPa using carbon dioxide pump or compressor and pressure-regulating equipment (e.g. back pressure valve system), and the temperature is kept at 25° C.

First step, the pressure of the pressurized liquid tank is kept at 8.0 MPa, the temperature is kept at 25° C., and sodium silicate solution is atomized into the high-pressure reactor through the nozzle (500 μm).

Second step, the product is discharged continuously from the high-pressure reactor (discharging rate at about 1.49 L/min).

Post processing: the content of sodium bicarbonate is measured by acid dropping method by taking out a small amount of liquid material after reaction, and the conversion rate of sodium silicate is calculated as 99.5%. The liquid material after reaction is washed (no bicarbonate ions), supercritically dried to obtain the product of silica. The properties of silica material are analyzed by ASAP2020, the BET specific surface area is 824 $m^2/g$, the BJH pore volume is 4.53 $cm^3/g$ and the BJH pore size is 21.9 nm. The properties of silica material are analyzed by Omec laser particle size analyzer, and the particle size $D_{50}$ is 17.8 μm.

Example 2

Materials: Sodium silicate nonahydrate (Sinopharm Chemical Reagent Co., Ltd., Analytically pure), carbon dioxide (Xiamen Linde gas, the purity≥99%).

Example 2 is similar to example 1, with the following difference: the pressure of the raw material tank is kept at 12.0 MPa, and sodium silicate solution is atomized into the high-pressure reactor through the nozzle (180 μm).

The conversion rate of sodium silicate is calculated as 99.7%, the BET specific surface area of the product of silica material is 710 $m^2/g$, the BJH pore volume is 4.55 $cm^3/g$ and the BJH pore size is 27.7 nm.

Example 3

Materials: Sodium silicate nonahydrate (Sinopharm Chemical Reagent Co., Ltd., Analytically pure), carbon dioxide (Xiamen Linde gas, the purity≥99%).

The procedure of this example is similar to that of example 1, with the following difference: in the first step, the pressure of the raw material reactor is kept at 10.0 MPa, and sodium silicate solution is atomized into the high-pressure reactor through the nozzle (500 μm).

The conversion rate of sodium silicate is calculated as 99.6%, the BET specific surface area of the product of silica material is 732 m$^2$/g, the BJH pore volume is 5.11 cm$^3$/g and the BJH pore size is 28.9 nm.

Example 4

Materials: Sodium silicate nonahydrate (Sinopharm Chemical Reagent Co., Ltd., Analytically pure), carbon dioxide (Xiamen Linde gas, the purity≥99%).

The procedure of this example is similar to that of example 1, with the following difference: 5 L of 0.75 mol/L sodium silicate solution is prepared.

The conversion rate of sodium silicate is calculated as 99.4%, the BET specific surface area of the product of silica material is 677 m$^2$/g, the BJH pore volume is 5.18 cm$^3$/g, the BJH pore size is 28.6 nm, and the particle size $D_{50}$ is 20.2 μm.

Example 5

Materials: Sodium silicate nonahydrate (Sinopharm Chemical Reagent Co., Ltd., Analytically pure), carbon dioxide (Xiamen Linde gas, the purity≥99%).

The procedure of this example is similar to that of example 1, with the following difference: in the first step, the pressure of the raw material reactor is kept at 12.0 MPa, and sodium silicate solution is atomized through the nozzle (500 μm).

The conversion rate of sodium silicate is calculated as 99.3%, the BET specific surface area of the product of silica material is 694 m$^2$/g, the BJH pore volume is 4.52 cm$^3$/g and the BJH pore size is 25.9 nm.

Example 6

Materials: Sodium silicate nonahydrate (Sinopharm Chemical Reagent Co., Ltd., Analytically pure), carbon dioxide (Xiamen Linde gas, the purity≥99%), n-butyl alcohol (Sinopharm Chemical Reagent Co., Ltd., Analytically pure).

The procedure of this example is similar to that of example 1, with the following difference: 5 L of 0.25 mol/L sodium silicate solution is prepared, and the additive of n-butyl alcohol is added.

The conversion rate of sodium silicate is calculated as 100%, the BET specific surface area of the product of silica material is 820 m$^2$/g, the BJH pore volume is 4.53 cm$^3$/g, and the BJH pore size is 18.6 nm.

Example 7

Materials: Sodium silicate nonahydrate (Sinopharm Chemical Reagent Co., Ltd., Analytically pure), carbon dioxide (Xiamen Linde gas, the purity≥99%), N,N-dimethylformamide (Sinopharm Chemical Reagent Co., Ltd., Analytically pure).

The procedure of this example is similar to that of example 1, with the following difference: 5 L of 0.25 mol/L sodium silicate solution is prepared, and the additive of N,N-dimethylformamide is added.

The conversion rate of sodium silicate is calculated as 99.2%, the BET specific surface area of the product of silica material is 848 m$^2$/g, the BJH pore volume is 5.38 cm$^3$/g, the BJH pore size is 22.2 nm, and the particle size $D_{50}$ is 15.3 μm.

Example 8

Materials: Sodium metaaluminate (Sinopharm Chemical Reagent Co., Ltd., Analytically pure), carbon dioxide (Xiamen Linde gas, the purity≥99%).

The procedure of this example is similar to that of example 1, with the following difference: the raw material is the liquid of sodium metaaluminate solution, and the calcined product is γ-Al$_2$O$_3$.

The conversion rate of sodium metaaluminate is calculated as 77.4%, the BET specific surface area of the product of γ-Al$_2$O$_3$ calcined at 500° C. is 89.3 m$^2$/g, the BJH pore volume is 0.41 cm$^3$/g, and the BJH pore size is 24.8 nm.

It can be seen from the above examples that rapid carbonation reaction under high pressure and continuous reaction (continuous discharging) can be achieved adopting the pressurized carbonation reaction apparatus and method thereof according to the present invention, with high conversion rate and good product quality.

The invention claimed is:

1. A pressurized carbonation reaction apparatus, comprising: a first gas tank with inert gas, a plurality of compressors, a plurality of first tanks, a plurality of pre-heaters, a nozzle, a second tank for storing raw material, a third tank for pressurizing the raw material, a second gas tank with carbon dioxide, a reactor, a fourth tank for storing raw product, a feed pump, a pressure display gauge, a temperature controller with display gauge and a plurality of back pressure valves;

an outlet of the first gas tank is connected to an inlet of a first compressor and a port of a first back pressure valve, an inlet of the first back pressure valve is connected to an outlet of the first compressor, and connected to an inlet of a first of the first tank via a first check valve, an outlet of the first of the first tank is connected to an inlet of a first pre-heater via a second check valve, an outlet of the first pre-heater is connected to a first inlet of the third tank;

an outlet of the second tank is connected to an inlet of the feed pump, an outlet of the feed pump is connected to an inlet of a second pre-heater, an outlet of the second pre-heater is connected to a second inlet of the third tank, an outlet of the third tank is connected to an inlet of the nozzle via a second check valve, an outlet of the nozzle is connected to a first inlet of the reactor, the first inlet of the reactor is provided in a top portion or a top side portion of the reactor; the nozzle being configured to atomize the raw material entering the reactor so that the raw material fully contacts and reacts with a carbon dioxide atmosphere in the reactor;

an outlet of the second gas tank is connected to an inlet of a second compressor and a port of a second back pressure valve, an inlet of the second back pressure valve is connected to an outlet of the second compressor, and connected to an inlet of a second of the first tank via a third check valve, an outlet of the second of the first tank is connected to an inlet of a third pre-heater via a fourth check valve, an outlet of the third pre-heater is connected to a second inlet of the reactor;

an outlet of the reactor is connected to an inlet of the fourth tank via a fifth check valve; the first of the first tank and the second of the first tank are both provided with pressure display gauges; the third tank and the reactor are both provided with temperature controllers with display gauges.

2. A method for pressurized carbonation reaction, wherein the pressurized carbonation reaction apparatus comprises:

a first gas tank with inert gas, a plurality of compressors, a plurality of first tanks, a plurality of pre-heaters, a nozzle, a second tank for storing raw material, a third tank for pressurizing the raw material, a second gas tank with carbon dioxide, a reactor, a fourth tank for storing raw product, a feed pump, a pressure display gauge, a temperature controller with display gauge and a plurality of back pressure valves;

an outlet of the first gas tank is connected to an inlet of a first compressor and a port of a first back pressure valve, an inlet of the first back pressure valve is connected to an outlet of the first compressor, and connected to an inlet of a first of the first tank via a first check valve, an outlet of the first of the first tank is connected to an inlet of a first pre-heater via a second check valve, an outlet of the first pre-heater is connected to a first inlet of the third tank;

an outlet of the second tank is connected to an inlet of the feed pump, an outlet of the feed pump is connected to an inlet of a second pre-heater, an outlet of the second pre-heater is connected to a second inlet of the third tank, an outlet of the third tank is connected to an inlet of the nozzle via a second check valve, an outlet of the nozzle is connected to a first inlet of the reactor, the first inlet of the reactor is provided in a top portion or a top side portion of the reactor;

an outlet of the second gas tank is connected to an inlet of a second compressor and a port of a second back pressure valve, an inlet of the second back pressure valve is connected to an outlet of the second compressor, and connected to an inlet of a second of the first tank via a third check valve, an outlet of the second of the first tank is connected to an inlet of a third pre-heater via a fourth check valve, an outlet of the third pre-heater is connected to a second inlet of the reactor; and an outlet of the reactor is connected to an inlet of the fourth tank via a fifth check valve; the first of the first tank and the second of the first tank are both provided with pressure display gauges; the third tank and the reactor are both provided with temperature controllers with display gauges;

wherein the method for pressurized carbonation reaction comprises the following steps:

1) weighing a solid material and dissolving it in a solvent completely, obtaining a liquid material, storing the liquid material in the second tank, preparing the liquid material with a concentration of 0.1~4.0 mol/L;

2) turning on the apparatus, a gas in the second gas tank is introduced into the reactor via the second compressor, controlling the temperatures of the reactor and the third tank, and then pumping the liquid material into the third tank by the feed pump to provide the third tank with pressure and ensuring a pressure difference between the third tank and the reactor;

3) after the temperatures and pressures of the reactor and the third tank are stabilized, opening the second check valve and ensuring that the liquid material fully contacts and reacts with a carbon dioxide atmosphere in the reactor after being atomize nozzle under a stable pressure difference between the reactor and the third tank;

4) ensuring opening the fifth check valve when the liquid material in the reactor is at a corresponding liquid level, continuously discharging and obtaining a reaction product.

3. The method for pressurized carbonation reaction as claimed in claim 2, wherein in step 2), the temperatures of the reactor and the third tank are 10~100° C.

4. The method for pressurized carbonation reaction as claimed in claim 2, wherein in step 2), the pressure of the reactor is 0.1~15.0 MPa, the pressure of the third tank is 2.0~20.0 MPa, the pressure of the reactor being lower than that of the third tank.

5. The method for pressurized carbonation reaction as claimed in claim 2, wherein in step 2), the pressure of the third tank is achieved by pumping the liquid material, or by pumping inert gas by the first compressor to obtain desired pressure; the pressure of the reactor is achieved by pumping carbon dioxide by the second compressor to obtain desired pressure.

6. The method for pressurized carbonation reaction as claimed in claim 2, wherein in step 3), the pressure of the third tank is controlled to be 10.0 MPa by pumping inert gas by the first compressor; the pressure of the reactor is controlled to be 4.0 MPa by pumping carbon dioxide by the second compressor.

7. The method for pressurized carbonation reaction as claimed in claim 2, wherein in step 4), the height of the liquid level in the reactor is controlled by the fifth check valve to achieve continuous and stable discharge of the reaction product.

* * * * *